Nov. 2, 1971  R. K. CARLSON  3,616,539

RANGE FINDER

Filed Feb. 3, 1969

CURVE OF INCREASING RADIUS

Inventor:
Richard K. Carlson.

By William F. Pinsak Atty 3,616,539
RANGE FINDER
Richard K. Carlson, Chicago, Ill., assignor to Bell &
Howell Company, Chicago, Ill.
Filed Feb. 3, 1969, Ser. No. 795,810
Int. Cl. G01c 3/00, 9/10
U.S. Cl. 33—71                               2 Claims

ABSTRACT OF THE DISCLOSURE

The distance of an optical instrument to a subject is determined according to the principle of triangulation by the position of a gravity orientable ball, in an arcuate track movable with the instrument, and arranged so that at each angle of inclination of its optical axis to a horizontal base, a predetermined track part is closest to the base. A scale of indicia along the track enables read-out of distance according to the position of the ball.

---

The present invention relates to rangefinders for optical instruments such as cameras. Particularly, the invention relates to a rangefinder of the class which is hypothecated on the principle of triangulation. According to that principle, the focal distance (shortest distance to a subject from a picture-taking or scene-focusing station) is a function of the angle of inclination to the subject at the base from said station.

A conventional rangefinder of the designated class comprises a pendulous member. (However, this is not necessary according to the teaching herein set forth.) It is mounted for movement to assume an angular aspect to the optical axis of a scene-sighting means associated with the rangefinder by rotating the scene-sighting means at or near a scene focusing station at or near a predetermined level above a base to view a subject at such base. The angle thusly formed by the optical axis and the pendulous member is a function of the angle of inclination of said axis to the subject at its base and accordingly of the focal distance. A scale of indicia arranged for movement relative the pendulous member enables read-out of the focal distance according to the relative condition of the pendulous member and the optical axis of the scene-sighting means at the time the subject is sighted at its base.

Most heretofore known rangefinders are relatively elaborate mechanisms having a plurality of components requiring close tolerances and time consuming assembly. Moreover, accurate readings for far distances become increasingly difficult as distance increases because the pendulous member swings on a fixed radius. As a result, the increment of angular pendulous movement becomes smaller for each increment of increase in focal distance.

It is an object of the present invention to provide an improved rangefinder for an optical instrument such as a camera.

Another object of the invention is to minimize the cost of said rangefinder by minimizing its components and their complexity.

A further object of the invention is to maximize accuracy of a rangefinder for far distances.

To effect the foregoing objects, a track having adjoining stations is arranged, in an optical instrument with means for sighting a subject, so that at each angle of inclination of said sighting means to a horizontal base, a predetermined station will be closest to said base. A gravity oriented body is mounted for movement along said track. Means are provided for indicating the distance from the instrument to a subject according to the relative positions of said track and the body.

Further and other objects will be apparent from the description of the accompanying drawings in which like numerals refer to like parts.

In the drawings:
FIG. 1 is a schematic view showing an optical instrument with a rangefinder embodying the present invention and illustrating the principle of triangulation.

Figure 1:
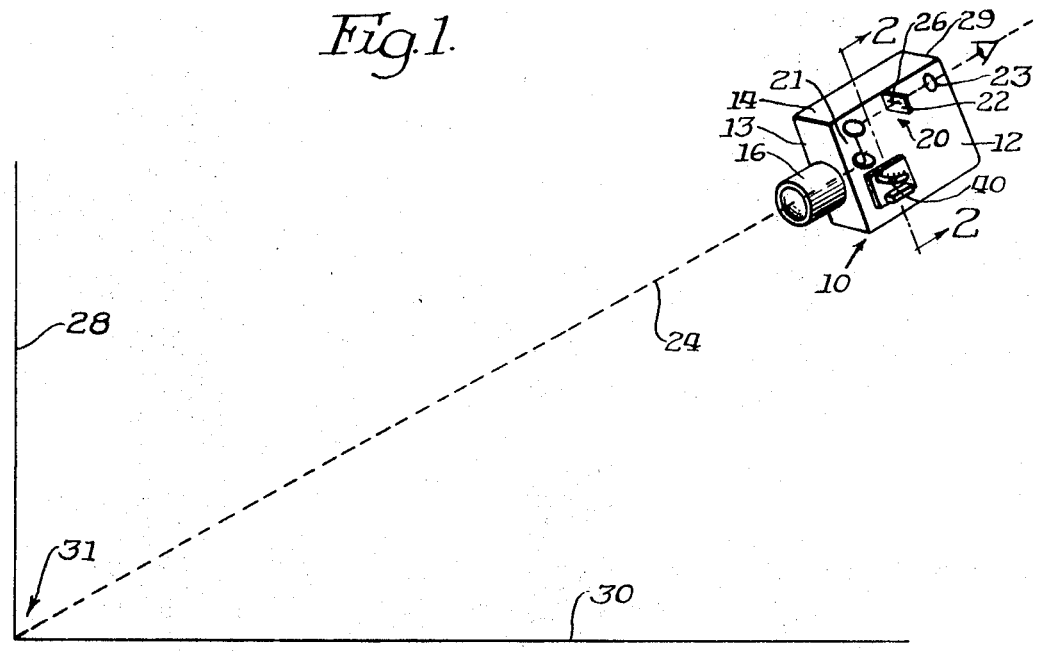

Referring to FIG. 1, an optical instrument, herein shown as camera 10, has a casing 14 defined by a pair of parallel sidewalls only one of which is identified by numeral 12, a rear wall 29 and a front wall 13. The latter supports a forwardly projecting focusable lens member 16.

Means for sighting a subject through lens member 16 is referred to as a viewfinder generally designated 20. It can be of any suitable construction. In the exemplary embodiment, it comprises a fixed reflector system 21 arranged in optical association with lens member 16 for receiving a fractional portion of light transmitted through said lens member. Rear wall 29 has a display aperture 23 for viewing the reflected image of a subject 28 (schematically shown by a vertical line) which projects upwardly from a base 30. A reticle 22 having indexing means, herein shown as line 26, is mounted in the space between reflector system 21 and aperture 23. Line 26 is disposed so that when it appears through aperture 23 coincident with the image of base 30 at subject 28 when camera 10 is held a standard level above said base, the camera is "in focus" and the aspect of the camera is such that a rangefinder, generally designated by the numeral 40, in accordance with the present invention will show the focal distance.

In accordance with the hypothecation on which rangefinder 40 is operative, the focal distance is a function of an angle of inclination 31 formed by optical axis 24 with base 30 at object 28. A translation of said angle of inclination into focal distance is achieved by the rangefinder which is mounted within housing 14 from sidewall 12.

Rangefinder 40 comprises a yieldably mounted member such as plate 38 with an arcuate groove which defines an arcuate track 34. Said track has a plurality of adjoining stations arranged so that at each angle of inclination, a predetermined station will be closest to said base. Means for indicating the focal distance according to said angle of inclination comprises a scale 36 of indicia fixed adjacent track 34 and herein shown identifying only select of the adjacent stations. It is appreciated that scale 36 assumes scene sighting will be undertaken at or near a predetermined level.

A gravity orientable body, herein comprising a ball 41, is releasably mounted in said groove for movement along said track. The parts are proportioned so that ball 41 when free, will be retained in said groove to assume a position along said track which is closest to base 30. In consequence thereof, the relative position of the track and the ball can be made to vary according to the angle of inclination of optical axis 24.

Figure 2:
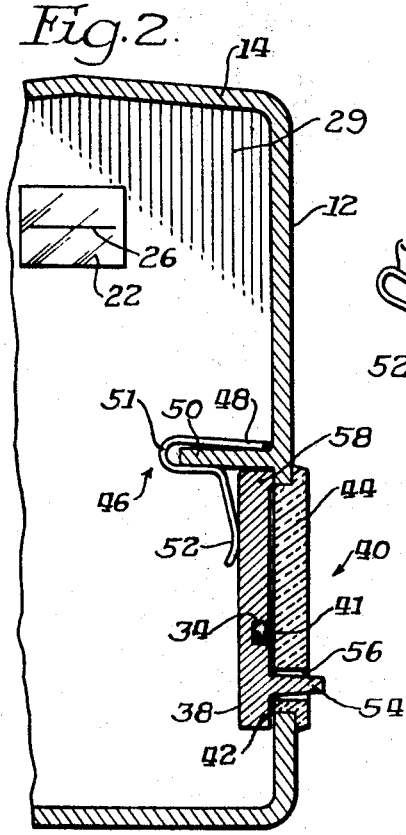
FIG. 2 is an enlarged detail view taken along section line 2—2 of FIG. 1 with parts broken away.
Figure 3:
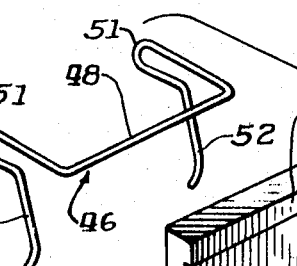
FIG. 3 is an exploded view in perspective of said rangefinder.
Figure 3:
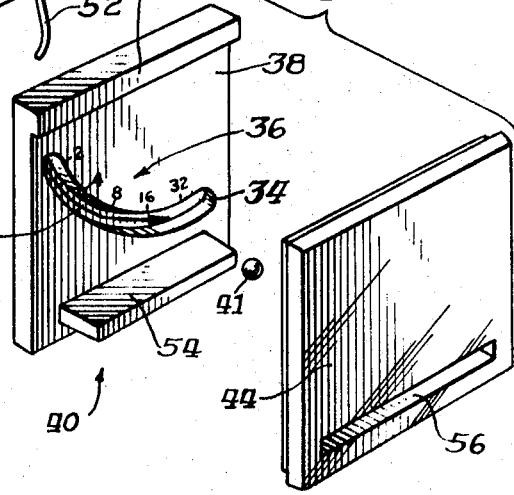

Plate 38 is mounted adjacent a window 42 formed in sidewall 12, through which scale 36 is displayed. A pane 44 mounted in window 42 is adapted for releasably impinging or clamping ball 41 at selected positions along track 34 and thereby enables movement of viewfinder 20 after a range determining sighting while retaining a prior relationship of said ball and said track. To that end, track 34 opens outwardly and ball 41 is proportioned for frictional engagement with said pane when disposed within the groove while member 38 is in its aspect illustrated in FIG. 2.

Plate 38 is yieldably held adjacent said pane in ball gripping association therewith to prevent movement of the ball by releasable securing means comprising a spring 46 when in its normal or untensioned condition has a medial or anchoring portion 48 which engages above a boss or ledge 50, the latter projecting normally inwardly from sidewall 12. The anchoring portion is fashioned with a pair of opposed book sections 51 which extend from above to beneath the ledge 50. A pair of downwardly projecting yieldable bearing fingers 52 which engage against opposite side sections of the upper part of plate 38 extend from section 51 to urge the plate into ball gripping association with sidewall 12.

To unclamp ball 41 and enable its free movement in track 34, a manual member 54, which is shown herein as integral with a lower portion of plate 38, projects outwardly from plate 38. To accommodate such projection herein, pane 44 is shown fashioned with a slot 56 through which the manual member projects. The arrangement is such that spring 46 when in its normal condition (FIG. 2) urges extension 54 through slot 56. However, rocking of plate 38 about an upper pivot rib 58 upon depression of manual member 54 against the tension of spring fingers 52, thereby to move track 34 away from pane 44 and liberate ball 41.

When it is desired to ascertain a focal distance, the associated subject is viewed at its base from about a predetermined height, preferably at or above the picture taking station through the viewfinder 20. Manual member 54 is depressed to release the ball 41, which will assume the lowest position in the track. Thereafter, the manual member may be released, thusly to restore plate 38 to ball clamping condition as spring 46 is restored to its normal condition. The position of the ball, thusly trapped, then can be read on scale 36 as an indication of focal distance, regardless of the inclination of the optical axis 24.

The present invention enables more accurate ascertainment of focal length, especially at long distances, than a pendulous rangefinder. This is because a pendulous rangefinder swings in an arc of constant radius and its increments of movement diminish in magnitude according to increase in focal length. A similar effect could be produced in the present invention by fashioning the arc of track 34 on a fixed radius. In accordance with one aspect of the present invention, however, this disadvantage can be overcome utilizing a track in which the radius of curvature becomes progressively larger toward the end where the ball rests at lesser angles of inclination, that is to say a curve of calculated design fashioned so that relatively large track increments are associated with distant focal lengths. In consequence thereof, such distant focal lengths may be accurately indicated by ball 41, when free. This result is achieved by increasing the radius of curvature of the track 34 according to increase in distance with which the track segments are associated.

What is claimed is:

1. In an optical instrument having means for sighting a subject, the combination of:
   a housing for said instrument;
   a track having adjoining stations arranged along a curve defined by a changing radius of curvature so that at each angle of inclination of said sighting means to a horizontal base a predetermined station will be closest to said base, said radius of curvature becoming progressively larger toward the stations associated with lesser angles of inclination;
   a gravity orientable free body mounted for movement along said track to a station closest to said base;
   a manually operable member projecting from said housing, and being manually displaceable from a free body securing position to a body release position; and
   means for indicating the distance of the instrument to a subject according to the relative positions of said track and said body.

2. A combination according to claim 1, characterized by a yieldably mounted member arranged in operative association with said securing means and having an arcuate slot defining said track, said body being a ball releasably mounted for movement in said slot to its closest position to said base by gravitational force.

References Cited

UNITED STATES PATENTS

| | | | |
|---|---|---|---|
| 884,955 | 4/1908 | Riches | 33—71 |
| 1,215,647 | 2/1917 | Green | 33—71 |
| 1,868,361 | 7/1932 | Leger | 33—206 |
| 2,168,885 | 8/1939 | Rickenbach et al. | 33—206 |

FOREIGN PATENTS

| | | | |
|---|---|---|---|
| 433,636 | 8/1935 | Great Britain | 33—206 R |

ROBERT B. HULL, Primary Examiner

U.S. Cl. X.R.

33—206